(12) United States Patent
Niemann et al.

(10) Patent No.: US 8,555,716 B2
(45) Date of Patent: Oct. 15, 2013

(54) DEVICE FOR MEASURING FOAMED MEDIA

(75) Inventors: Thomas Niemann, Delmenhorst (DE); Thomas Kueck, Weyhe-Kirchweyhe (DE); Ingo Zoyke, Stuhr (DE); David Hessenkaemper, Bremen (DE); Sergej Tonewizki, Diepholz (DE)

(73) Assignee: Hella KGaA Hueck & Co., Lippstadt (DE)

( * ) Notice: Subject to any disclaimer, the term of this patent is extended or adjusted under 35 U.S.C. 154(b) by 418 days.

(21) Appl. No.: 12/932,722

(22) Filed: Mar. 4, 2011

(65) Prior Publication Data

US 2011/0226212 A1    Sep. 22, 2011

(30) Foreign Application Priority Data

Mar. 16, 2010   (DE) .......................... 10 2010 011 490

(51) Int. Cl.
*G01F 23/28*    (2006.01)
(52) U.S. Cl.
USPC ....................................... 73/290 V; 73/290 R
(58) Field of Classification Search
USPC ............................................ 73/290 R, 290 V
See application file for complete search history.

(56) References Cited

U.S. PATENT DOCUMENTS

| | | | |
|---|---|---|---|
| 3,864,609 A | 2/1975 | Di Giacomo | |
| 7,895,890 B2 * | 3/2011 | Van Ee | 73/298 |
| 2006/0201578 A1 | 9/2006 | Schillinger et al. | |
| 2009/0301187 A1 | 12/2009 | Beyer et al. | |
| 2012/0152015 A1 * | 6/2012 | Beyer et al. | 73/290 V |

FOREIGN PATENT DOCUMENTS

| | | |
|---|---|---|
| DE | 41 29 401 | 3/1993 |
| DE | 10 2007 014 540 | 10/2008 |
| DE | 10 2008 027 969 | 12/2009 |
| EP | 2 133 670 | 12/2009 |
| WO | WO 2008/009277 | 1/2008 |

OTHER PUBLICATIONS

European Search Report dated Aug. 9, 2011 in European Application No. 11 15 6554 with English translation of relevant portion of same.
English translation of German Search Report dated Dec. 1, 2010 in German Application No. 10 2010 011 490.1.
English translation of German Search Report dated Dec. 22, 2010 in German Application No. 10 2010 011 492.8.
European Office Action dated Jun. 21, 2011 and European Search Report dated Jun. 9, 2011 in European Application No. 11157857.1 with English translation of the relevant parts.

* cited by examiner

*Primary Examiner* — Hezron E Williams
*Assistant Examiner* — Rodney T Frank
(74) *Attorney, Agent, or Firm* — Collard & Roe, P.C.

(57) ABSTRACT

A device for measuring the fill level in a container has an ultrasound sensor and a damping beaker with at least one antechamber. The antechamber has an inlet opening to the container and an outlet opening to the damping beaker, and has a geometric structure, which guides a fluid at least once around the midpoint of the damping beaker. The antechamber has at least two planes lying horizontally over each other. Each plane has a geometric structure, and the geometric structures of the planes are designed so that the fluid streams through the planes in opposite directions. As a result, the path to be traversed in the antechamber is lengthened, and the inflowing medium is additionally swirled. Even foamed media that quickly flow into the antechamber are effectively retained, and degassing is possible prior to entry into the measuring section of the ultrasound sensor.

13 Claims, 10 Drawing Sheets

DEVICE FOR MEASURING FOAMED MEDIA

CROSS REFERENCE TO RELATED APPLICATIONS

Applicants claim priority under 35 U.S.C. 119 of German Application No. 10 2010 011 490.1 filed Mar. 16, 2010, the disclosure of which is incorporated by reference.

BACKGROUND OF THE INVENTION

The invention relates to a device for measuring a fill level in a container with an ultrasound sensor, wherein the ultrasound sensor has allocated to it a damping beaker with at least one antechamber, and the antechamber has an inlet opening to the container and an outlet opening to the damping beaker.

Predominantly ultrasound sensors are used to determine the oil level in engines. These emit sound waves, which are reflected at the interface between two media, e.g., gas and oil, wherein fluids other than oil can also be measured, and again received by the ultrasound sensor. The fill level in the container having the device can then be derived from the determined runtime of the sound waves. However, the fill level is difficult if not impossible to determine when an engine is operational, in particular one in a motor vehicle, since the oil is highly foamed, and the sound waves are reflected by the gas bubbles in the oil. As a result, there is a very wide scattering of detected values.

However, a distinct interface must be present between the gas and oil media for evaluable measurements. In order to counter the problem of widely scattering values, damping devices, e.g., so-called damping beakers, are allocated to the ultrasound sensors. These damping beakers envelop the measuring section of the ultrasound sensor, and the fluid to be measured therein is calm, and only a small opening in the damping beaker to the container connects it with the latter. Fewer gas bubbles get into the damping beaker through the small opening in the damping beaker to the container. The fill level in the damping beaker here reflects the liquid level outside of the damping beaker.

Publications DE 10 2008 027 969 A1 and WO 2008/009277 A1 show further developments of such a damping beaker. A pre-volume allocated to the damping beaker in both publications. These pre-volumes are used to degas the fluid to be measured, e.g., foamed oil, so that a fluid relatively free of bubbles flows into the measuring section of the damping beaker. The pre-volumes are here designed in such a way as to guide the fluid in a plane through the structures arranged in the chambers to the inlet opening of the damping beaker.

However, tests revealed that the foamed oil in an engine streams through the known pre-volumes and chambers very rapidly given sudden jumps in speed, e.g., from 3000 to 4000 or 5000 RPM, without it being possible to degas the foamed oil in the pre-volumes. Therefore, gas bubbles are introduced into the measuring section of the damping beaker, impeding the correct display of the fill level. Since these gas bubbles can only slowly escape the measuring section of the damping beaker, the known sensors do not detect the actual fill level in the container even long after the jumps in speed, even though a measurable fill level is present outside the damping beaker.

The time for which the fill level is not correctly determined is called the dead time, and potentially leads to an error message indicating too low a fill level in the container. This problem is encountered in particular given a dynamic driving style over a longer period, since the long dead times in which the actual fill level is not determined eliminates the ability to calculate an average value, as a consequence of which "wrong actions" stemming from the untrue error message can result in major damages.

SUMMARY OF THE INVENTION

The object of the invention is to provide a device of the kind mentioned at the outset in which the pre-volume is designed in such a way that the fill level can also be reliably determined even given a dynamic driving style with sudden jumps in speed and highly foamed oil.

This object is achieved with a device for measuring a fill level in a container with an ultrasound sensor, wherein the ultrasound sensor has allocated to it a damping beaker with at least one pre-chamber, and the pre-chamber has an inlet opening to the container and an outlet opening to the damping beaker. The antechamber has at least two planes lying horizontally over each other, wherein each plane has a geometric structure, and that the geometric structures of the planes are designed in such a way that the fluid streams through the planes in opposite directions.

An antechamber of the fill level measuring device designed with two planes ensures that even highly foamed fluids that enter the antechamber at high speeds, e.g., oil in the engine of a motor vehicle, are decelerated in the antechamber and degassed in the antechamber. This is accomplished on the one hand by the section in the antechamber, which is longer by comparison with an antechamber with only one plane, and on the other by virtue of the opposing flows through the two planes. The fluid is here intensively swirled, especially during the transition from one to the other plane, which reduces the flow rate of the fluid to a particularly great extent. In this way, gas bubbles trapped in the fluid can be effectively retained in the antechamber, and escape from the foamed fluid.

The planes are advantageously coupled together in such a way that the fluid flows through the planes from the top down. Advantage is here taken of the fact that the density of the foamed fluid is less than the density of the fluid without gas bubbles, and that the gas contained in the fluid gravitates upward. In this way, the gas exiting the fluid and flowing upward during the degassing process in the antechamber can easily escape, and be removed from the antechamber. Therefore, the inlet opening in the antechamber is allocated to the uppermost of the two planes. The lower plane preferably has allocated only one connection opening to the upper plane, and an outlet opening to the inlet opening of the measuring section. If the flow were to proceed from the bottom up through the planes of the antechamber, the gas could accumulate at an upper point within the antechamber and not be removed, making its way into the measuring section of the damping beaker.

The geometric structure of the planes in the antechamber is critical in terms of how the flow passes through the individual planes, and whether the inflowing medium can be effectively degassed. In order to achieve as simple a design as possible, it is provided that the geometric structure consist of deflection elements in at least one of the planes in the antechamber. These deflection elements can be designed in a plurality of ways. One simple way involves hinging one side of the deflection elements to the wall of the antechamber planes. The side facing away from the wall forms a free end in the antechamber, and is advantageously characterized in that at least one deflection element is rounded and thickened toward the free end, thereby in turn improving the flow characteristics within the antechamber.

In a further development, the deflection elements arranged in the planes form a geometric structure, which is characterized in that the geometric structure is designed as a meander in at least one plane. This meander is formed by deflection elements alternately arranged on the opposing walls of the antechamber extending around the measuring section of the damping beaker. Therefore, the resultant channel formed in the antechamber exhibits windings based on the number of deflection elements, wherein a reduction in flow rate is achieved with each winding. As a result, the space available in the antechamber is optimally utilized, and the length of the section of channel between the inlet opening in the antechamber and outlet opening to the inlet opening of the measuring section has the longest possible design.

In one embodiment of the meander, at least one of the planes has more than one meander, and the meanders are separated from each other in the plane. The separation of meanders must here be understood as meaning that the inflowing fluid is divided into at least two channels in the area of the inlet opening of the respective plane, which only converge again at the outlet opening of the respective plane, wherein each of the channels is designed as a meander. By dividing the inflowing fluid into partial streams, they are slowed within a shorter section. When the partial streams are merged, the fluid is also swirled further, thereby enabling an even better degassing.

In another embodiment, the geometric structure is preferably comprised of individual barriers, which are staggered relative to each other in at least one of the planes. This arrangement causes the inflowing fluid to be distributed over the entire surface of the plane, and be repeatedly deflected, separated and merged. As a result, the fluid is continuously swirled. Among other things, V-shaped deflection elements are suitable as the barriers.

The same type of continuous swirling is also generated by an embodiment with a geometric structure having domes in at least one of the planes. Depending on the number and shape of the domes, the inflowing fluid is deflected and swirled, wherein a higher number of domes has a greater influence on the flow of the fluid than a few domes.

In another embodiment, the geometric structure is designed as a spiral in at least one plane. As in the meander structures, the longest possible distance is here established between the inlet and outlet opening of the antechamber, which while it only has small, if any, deflection elements projecting into the flow channel, allows just as long a section of the channel.

In both the meander and other embodiments, it can be provided that the antechamber have allocated to it a second outlet opening, which is arranged in the direction of flow directly in back of the inlet opening of the antechamber to the container and in front of the windings of the antechamber. Fluid that suddenly flows into the antechamber can be removed via the second outlet opening. It is here critical that the fluid already located in the antechamber be more slow-moving than the inflowing fluid. As a result, less of the highly foamed fluid, e.g., oil in an engine, gets into the antechamber overall, the positive effect of which fewer gas bubbles in the antechamber need to escape from the fluid to keep the fluid streaming toward the measuring section free of bubbles. In order to fully realize this advantage, the second outlet opening must be arranged directly in back of the inlet opening in the upper plane, so that a majority of the highly foamed fluid flowing in at an especially rapid rate is already discharged before the actual antechamber.

To prevent highly foamed fluid from also penetrating into the antechamber by way of this second outlet opening in the antechamber, it is provided that the second outlet opening empty into a discharging device, in particular a discharging pipe, which is arranged parallel to the measuring section in the damping beaker and has a vent opening. A compact structural design is achieved via the parallel arrangement to the damping beaker, in particular if the discharging device adjoins the measuring section of the damping beaker. Since the measuring section in the damping beaker of the ultrasound sensor must be aligned perpendicular to the horizontal to enable a correct measurement of the fill level, the discharging device arranged parallel thereto is also aligned perpendicular to the horizontal, and advantageously situated at a height corresponding to roughly the height of the measuring section.

At specific speeds or in specific speed ranges, the damping beaker is excited and made to oscillate. In the process, a wake can arise inside the damping beaker, amplifying the inflow of fluid into the device. As a result of arranging the discharging device parallel to the measuring section of the damping beaker and at the same height as the measuring section, the wake comes about in both the measuring section and discharging device of the damping beaker. Instead of getting into the measuring section through the antechamber as in known damping beakers, the inflowing fluid can also be removed via the discharging device, even if a wake arises. This is also facilitated by arranging the second outlet opening with the discharging device near the inlet opening in the antechamber, and as the result of the slow-moving medium in the antechamber. This discharging device can also be a bypass, flue or channel, provided it is ensured that no fluid can get into the discharging device from above.

To protect both the discharging device and measuring section against unintended penetration of fluid and foamed oil, it is provided that a screening element preferably designed as a cap be arranged in the upper end area of the discharging device and measuring section. This screening element can consist of several parts, with each vent opening of the damping beaker having a single screening element, or all designed as a single part of the measuring section and discharging device due to the similar height of both vent openings.

In addition, the invention relates to an engine, in particular a motor vehicle engine or a motor vehicle, each characterized in that they have a device as described above.

BRIEF DESCRIPTION OF THE DRAWINGS

The invention will be explained in greater detail based on a preferred exemplary embodiment depicted in the drawing. Shown individually on.

DETAILED DESCRIPTION OF THE EMBODIMENTS

Figure 1:
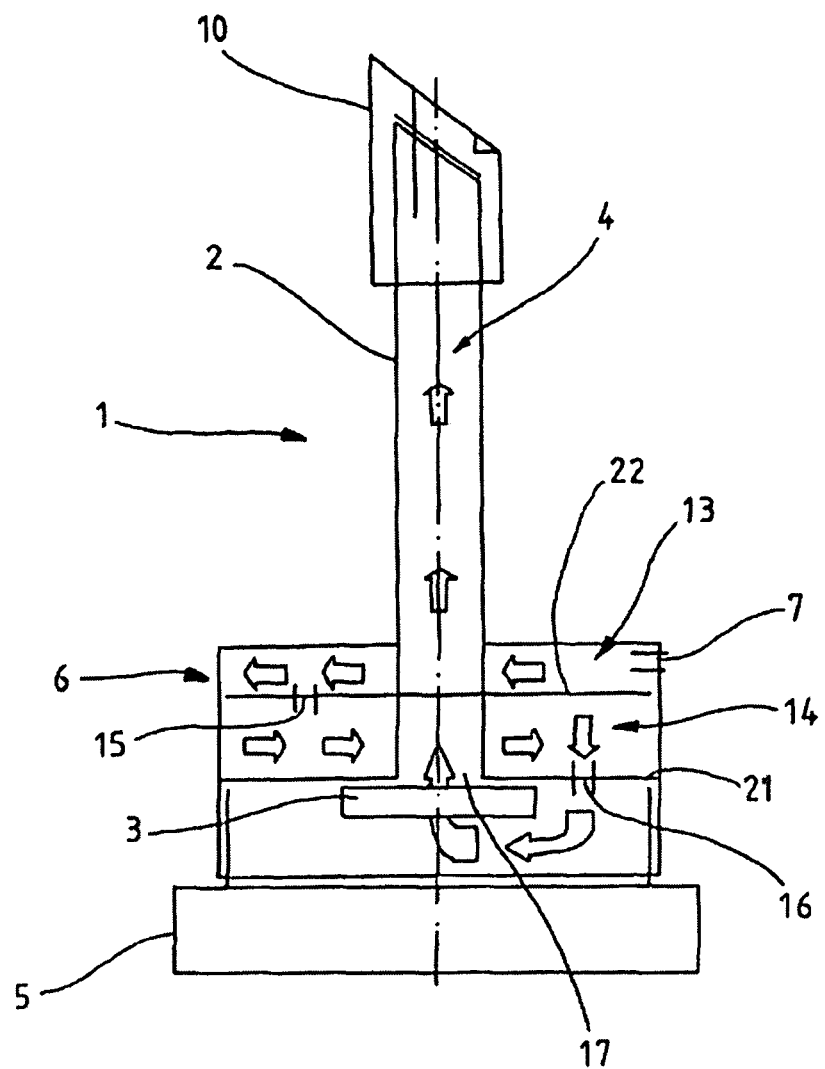
FIG. 1: is a diagrammatic depiction of the direction of flow in the device with an antechamber divided into two planes.
Figure 2:
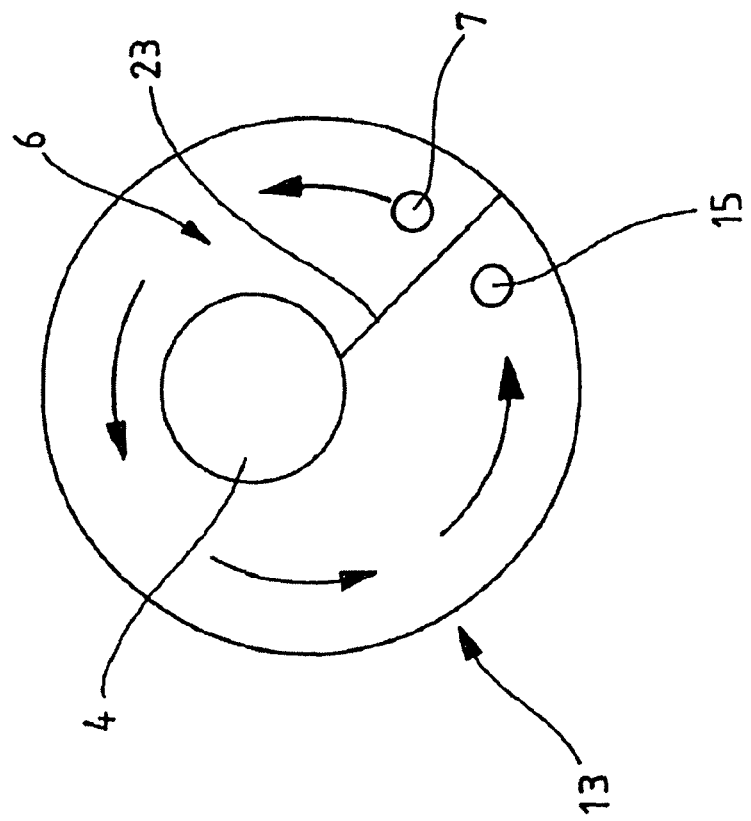
FIG. 2: is a diagrammatic depiction of the direction of flow in the upper level of the device on FIG. 1, top view.
Figure 3:
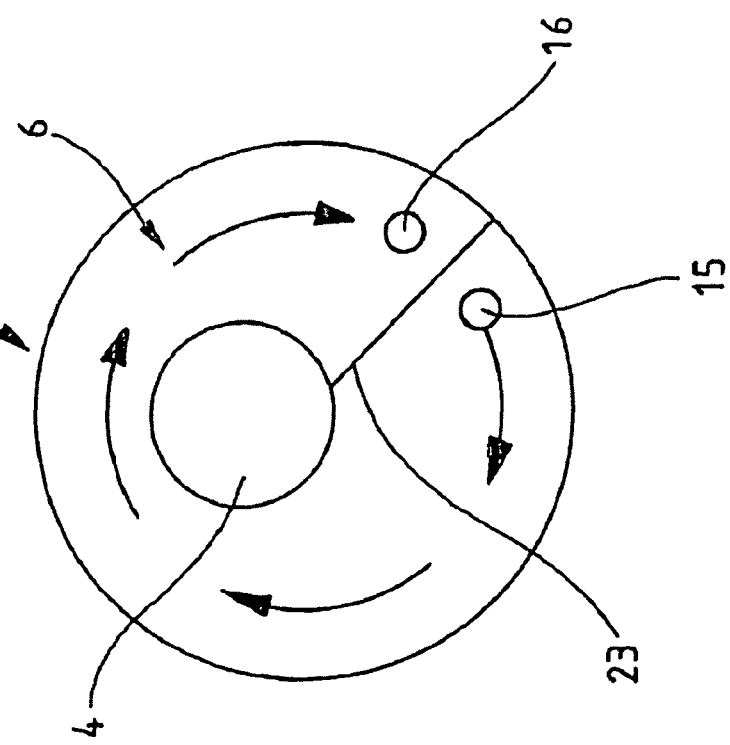
FIG. 3: is a diagrammatic depiction of the direction of flow in the lower level of the device on FIG. 1, top view.

An antechamber 6 of a device 1 for determining the fill level in a container has an upper and lower plane 13, 14, wherein a flow passes through both planes 13, 14 in opposing directions. FIG. 1 to FIG. 3 show the direction of flow of an inflowing fluid in the device 1. The floor area of the device 1 on FIG. 1 has an ultrasound sensor 3. This ultrasound sensor 3 is arranged on a pedestal element 5 of the device 1. A damping beaker 2 is arranged centrally over the ultrasound sensor 3, wherein the interior of the damping beaker 2 has a measuring section 4. Given a filled container, this measuring section 4 is occupied with fluid, in particular oil, in an oil pan of a motor vehicle, depending on the fill level of the container.

The ultrasound sensor 3 and measuring section 4 are arranged one over the other along a line, wherein the ultrasound sensor 3 sends the generated sound waves into the measuring section 4 of the damping beaker 2. To obtain correct measured values, the ultrasound sensor 3 and measuring section 4 are arranged perpendicular to the horizontal. The pedestal element 5 is abutted by the antechamber 6. The latter is divided into an upper plane 13 and a lower plane 14. The upper plane 13 has an inlet opening 7, and the lower plane 14 has an outlet opening 16, wherein both planes are joined with each other via the connection opening 15 situated in a separating element 22. The flow passes through the upper plane 13 first, and then the lower plane 14. The direction of flow in the upper plane 13 and lower plane 14 is shown on FIG. 2 and FIG. 3.

The device 1 has a screening element 10 in the upper end area of the measuring section 4 of the damping beaker 2. This screening element 10 is designed as a cap that covers the vent opening of the measuring section 4, where an outer venting device is provided in the screening element 10 itself, making it possible to degas the measuring section 4. The screening element 10 hampers the penetration of oil foam or other foamed fluids into the measuring section 4.

FIG. 2 shows the direction of flow in the upper plane 13 denoted by arrows. After the fluid has flowed into the antechamber 6 via the inlet opening 7, the geometric structure provided in the upper plane 13 again routes the fluid around the measuring section 4 of the damping beaker counterclockwise. The fluid then passes through the connection opening 15 and enters the lower plane 14 depicted on FIG. 3. In the lower plane 14, the provided geometric structure causes the fluid to flow clockwise once more around the measuring section 4 of the damping beaker 2 to the outlet opening 16. It is here critical that the direction of flow in the lower plane 14 shown on FIG. 3 be opposite the one in the upper plane 13 shown on FIG. 2. The respective geometric structure in the planes 13, 14 is dictated by a blocking element 23. This blocking element 23 is arranged between the openings in the respective plane, and ensures that the inflowing fluid is guided once around the measuring section 4. As evident from FIG. 1, the fluid then flows from the outlet opening 16 into the measuring section 4.

Figure 4:
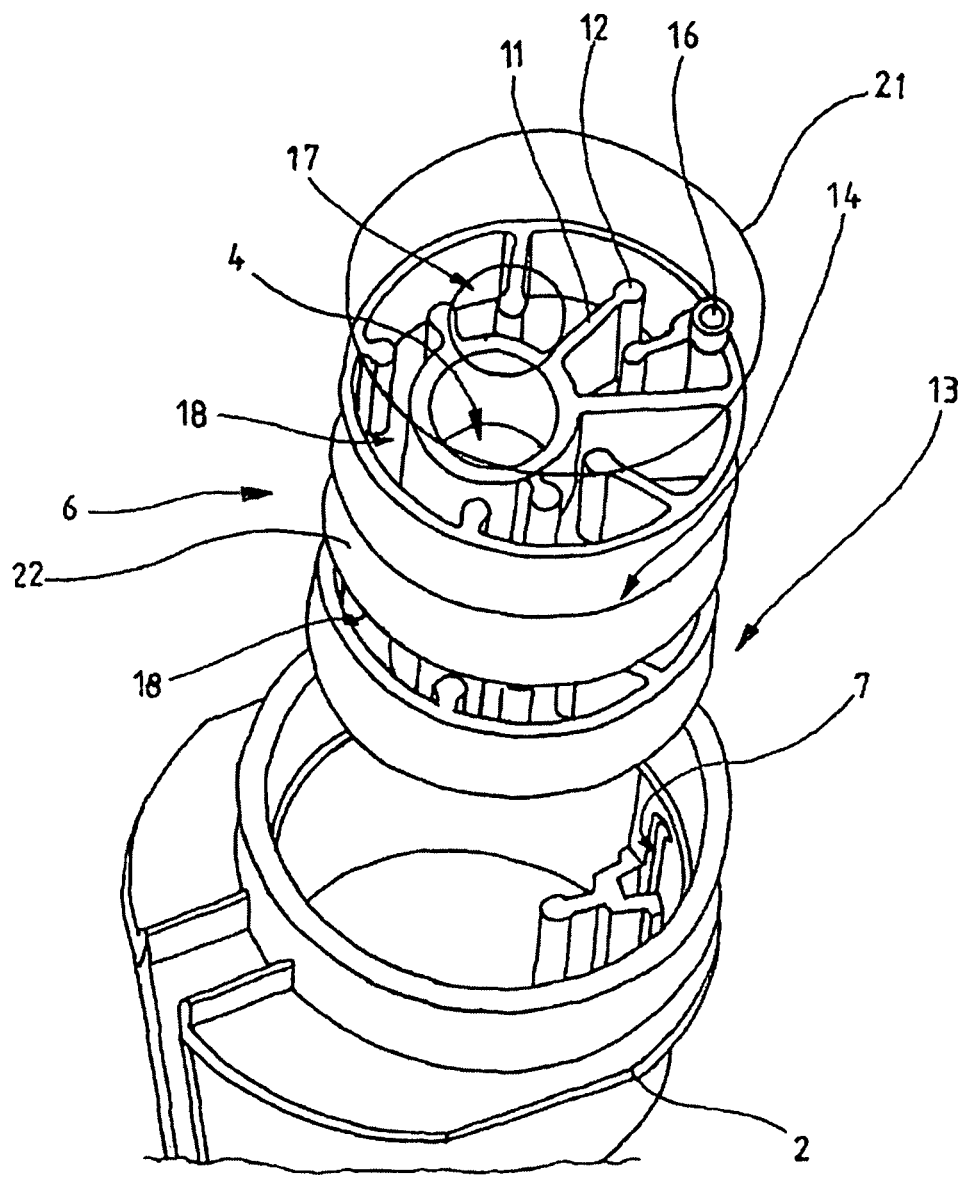
FIG. 4: is an exploration drawing of a device according to the invention, in which the antechamber is divided into two planes, perspective view.

FIG. 4 presents an exemplary embodiment of a device according to the invention. The device 1 in the drawing is here depicted with the floor area to the top, so that the lower plane 14 of the two planes is shown above the upper plane 13. A floor element 21 seals the antechamber at the bottom, and has the outlet opening 16 to the antechamber and an inlet opening 17 in the measuring section 4. Adjoining this floor element 21 is the lower plane 14, which is connected with the upper plane 13 via the connection opening 14 in the separating element 22. The floor element 21 and separating element 22 of the antechamber 6 are here each designed as a plate under or between the planes 13, 14 of the antechamber 6.

In the indicated damping beaker 2, the outer part of the inlet opening 7 of the antechamber 6 to the container is depicted, which interacts with a matching opening in the upper plane 13 of the antechamber 6. Both planes 13, 14 have a geometric structure that is routed once around the measuring section 4 of the device 1 in each plane, and designed as a meander by deflection elements 11 that project into a channel 18.

Figure 5:
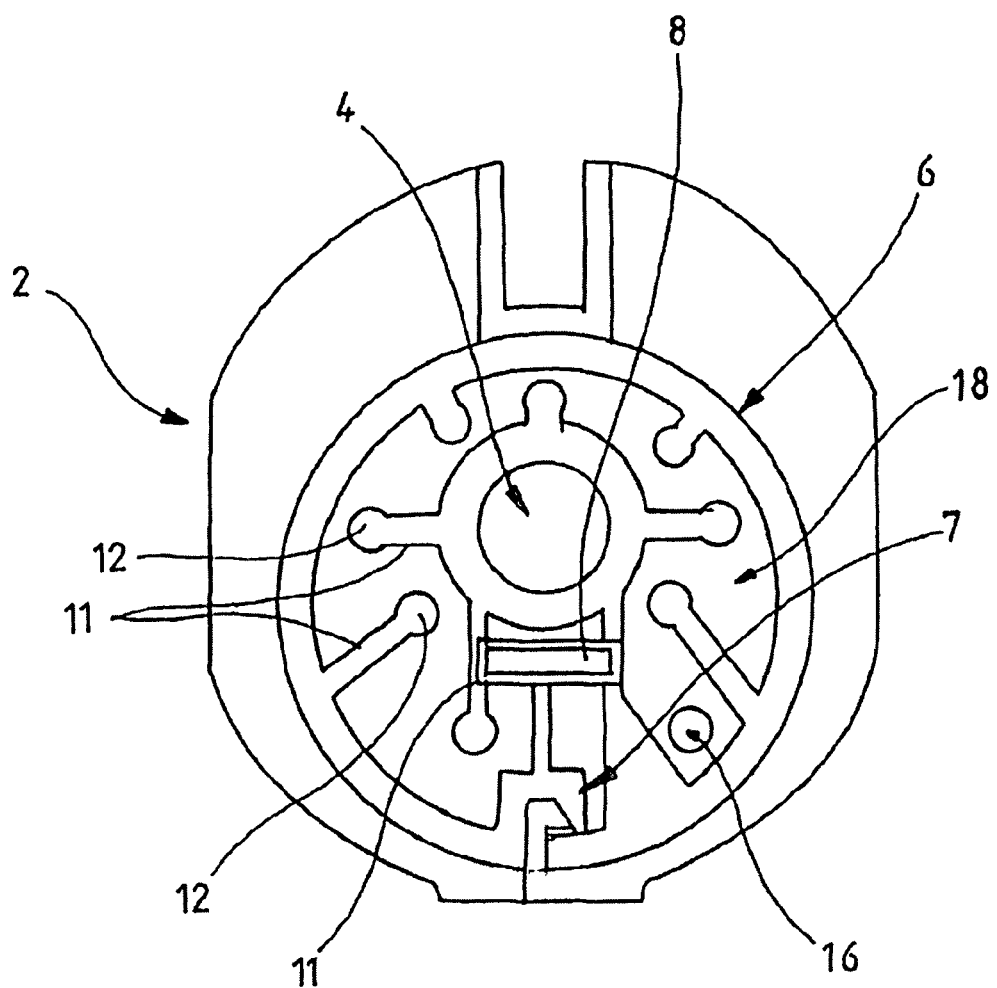
FIG. 5: is a sectional depiction of a device according to the invention in the plane of the antechamber, top view.

The geometric structure of the upper plane 13 and the resultant guiding of the inflowing fluid in the antechamber is again shown on FIG. 5 to illustrate the meander structure. Situated in the middle of the antechamber 6 is the measuring section 4, which is enveloped by the antechamber 6. This configuration of the antechamber 6 yields a channel 18 that is routed once around the measuring section 4. This channel 18 joins the inlet opening 7 to the container with the outlet opening 16 to the inlet opening 17 of the measuring section 4 of the damping beaker 2. A plurality of deflection elements 11 in the channel 18 of the antechamber 6 here form impediments.

The built-in deflection elements 11 lead to windings, around which the inflowing fluid is diverted and slowed. These deflection elements are alternately joined with the opposing walls of the channel 18. As a result, the flow of fluid in this exemplary embodiment can be compared with a meander. The number of windings here corresponds to the number of deflection elements 11 installed in the antechamber 6. The free ends of the deflection elements 11 are additionally provided with rounded thickened areas 12. The configuration of the channel 18 makes the path in the antechamber 6 to be traversed by the fluid as long as possible. The geometric structure of the lower plane 14 is identical in setup to the geometric structure of the upper plane 13, except that the outlet opening 16 is arranged in the area of the inlet opening 7 at the end of the channel 18 instead of the inlet opening 7.

FIG. 5 also shows an outlet opening 8, which passes over into a discharging device 9. The corresponding discharging device 9 is depicted on FIG. 11. In each case, the outlet opening must be provided close to the inlet opening 7.

If a container is equipped with a device 1 and receives the fluid to be measured, in particular oil in the engine of a motor vehicle, the antechamber 6 and measuring section 4 of the device 1 become filled with the fluid. During operation of the motor vehicle engine with a device 1 according to the invention in the engine compartment, the fluid is foamed by the constant circulation. The foamed fluid first flows via the upper plane 13 to the connection opening 15, through which the fluid gets into the lower plane 14.

The geometric structure of the channel 18 formed by the deflection elements 11 reduces the flow rate, and gas bubbles can escape from the foamed fluid before the antechamber 6 has been traversed. During the transition from the upper plane 13 to the lower plane 14, the fluid is additionally swirled by the opposite flow in the planes 13 and 14, thereby improving the dissolution of gas bubbles and foam, so that a completely bubble-free fluid in the measuring section 4 can be ensured, even at high and rapidly inflowing quantities. The fluid then passes from the lower plane 14 via the outlet opening 16 to the inlet opening 17, and into the measuring section 4 of the damping beaker 2, where the fill level is measured with the sound waves emitted by the ultrasound sensor 3. The gas in the measuring section 4 can escape as the fill level rises by way of a ventilation device in the upper end area of the measuring section 4 and in the screening element 10, and penetrate back into the measuring section 4 as the fill level drops. The fill level present in the measuring section 4 here corresponds to the fill level in the container.

FIG. 6 to 10 show additional embodiments of an antechamber 6 with two planes 13, 14. In this case, FIG. 6 to 10 each depict the upper plane 13 and lower plane 14 next to each other in a top view. Also visible on each of FIG. 6 to 10 are the inlet opening 7 in the upper plane 13, the connection opening 15 between the upper plane 13 and the lower plane 14, the outlet opening 16 in the lower plane 14, and the measuring section 4. The differences between FIG. 6 to 10 arise from the configuration of the structures in the antechamber planes.

Figure 6:
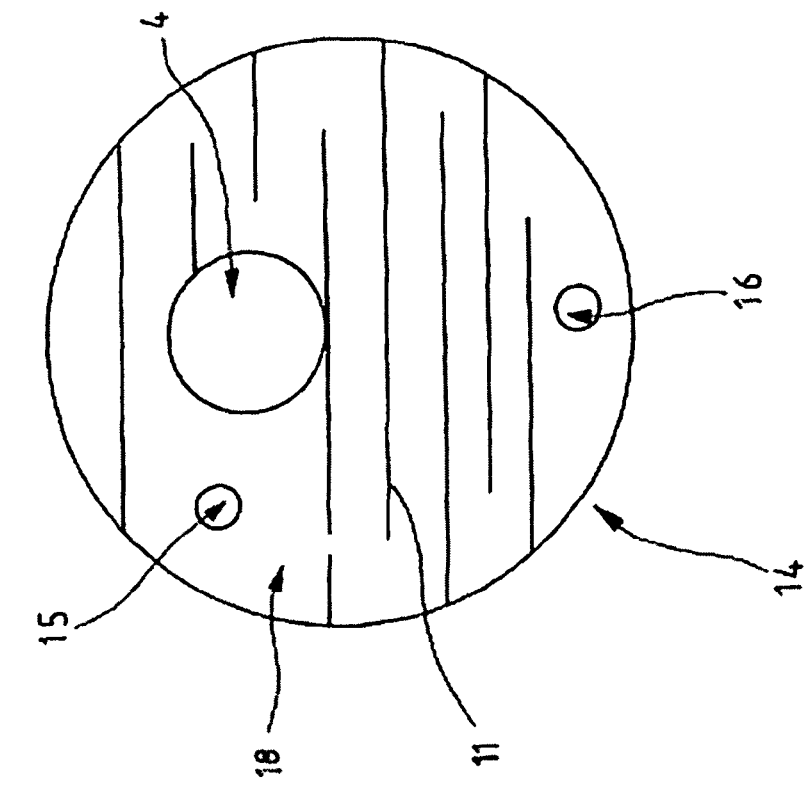
FIG. 6: is a depiction of the planes in an embodiment of an antechamber with two levels and deflection elements arranged in the planes, top view.
Figure 6:
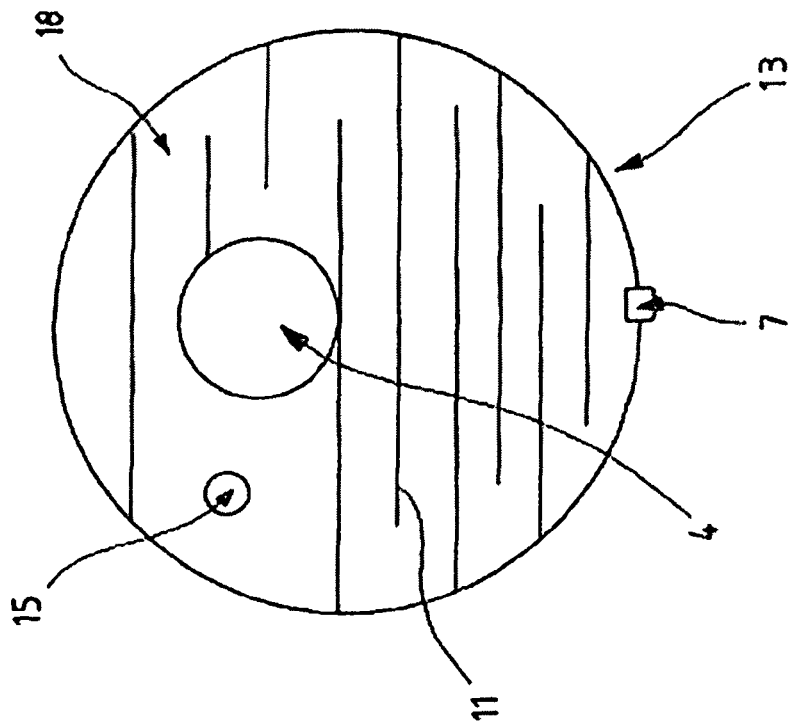

FIG. 6 depicts deflection elements 11 aligned parallel to each other, which project from the antechamber wall inside the antechamber 6, and form a channel 18 designed as a meander in the respective plane, wherein both planes 13, 14 carry opposing flows, as shown on FIG. 2 and FIG. 3.

Figure 7:
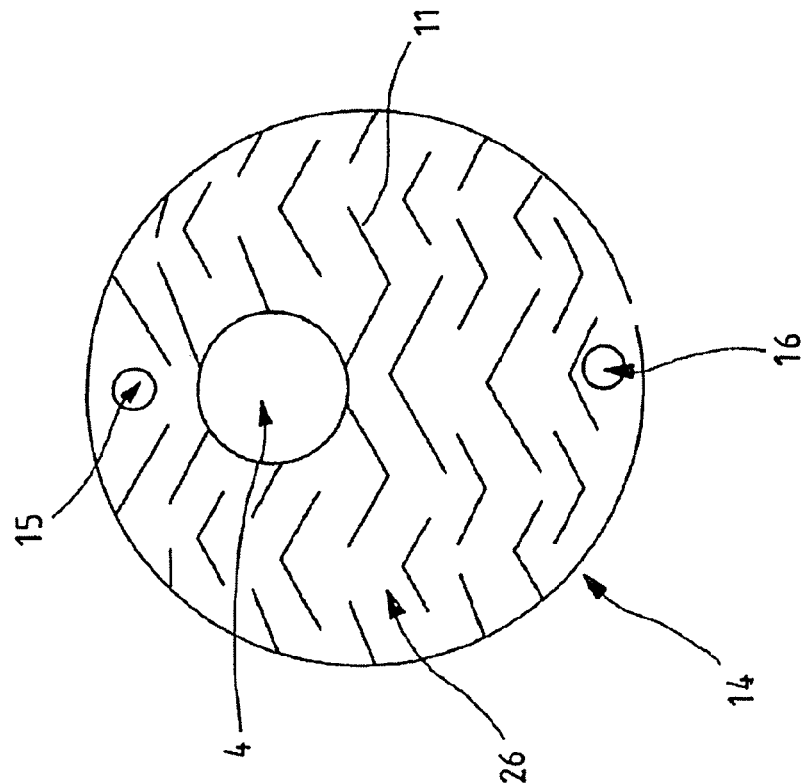
FIG. 7: is a depiction of the planes in a second embodiment of an antechamber with two planes and deflection elements arranged in the planes, top view.
Figure 7:
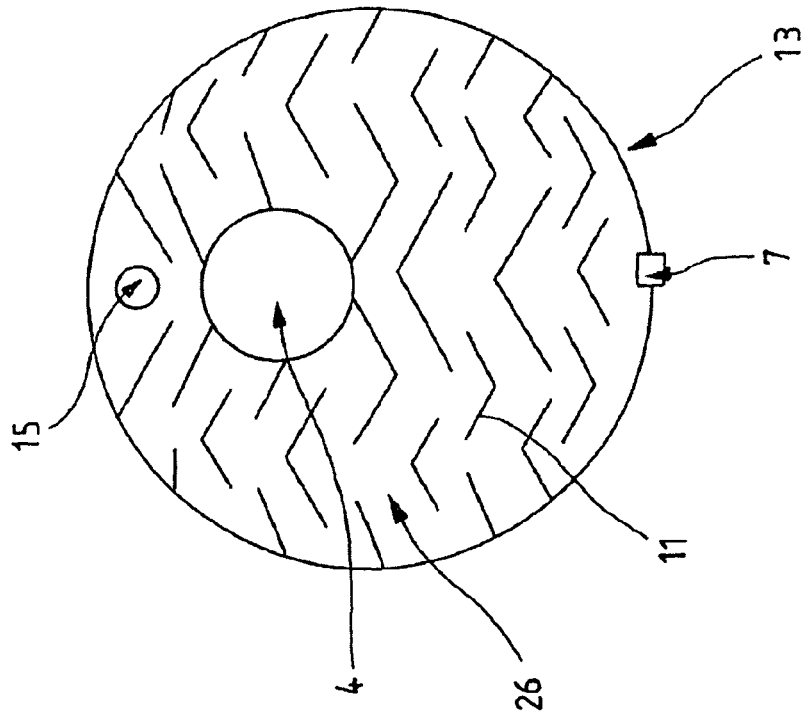

In the antechamber structure on FIG. 7, the deflection elements 11 are formed as barriers, which divide the inflowing fluid over the entire surface 26 of the upper plane 13 and the lower plane 14. The individual deflection elements 11 each have a V-shape in this embodiment, and are arranged in the planes 13, 14 in such a way that the openings between the individual deflection elements 11 are offset relative to each other.

Figure 8:
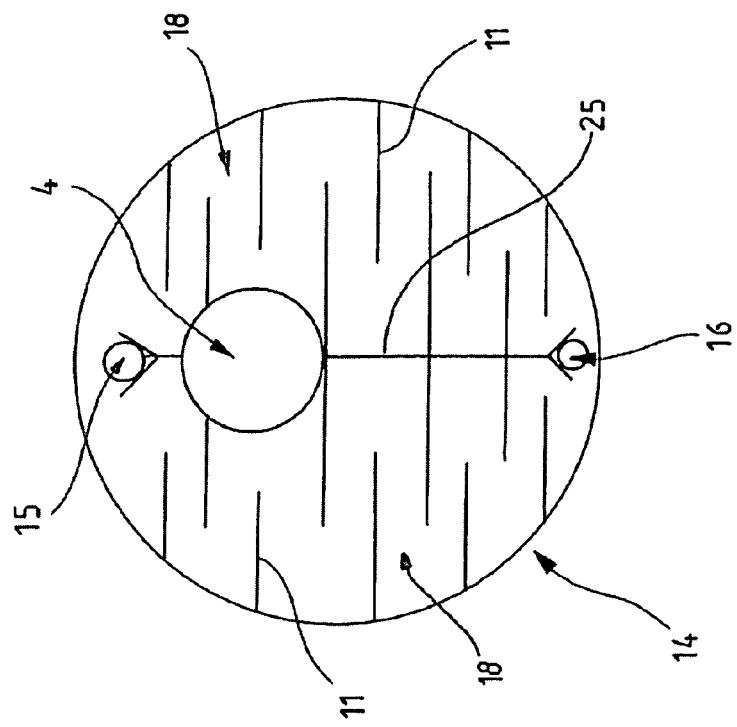
FIG. 8: is a depiction of the planes in a third embodiment of an antechamber with two planes and deflection elements arranged in the planes, top view.
Figure 8:
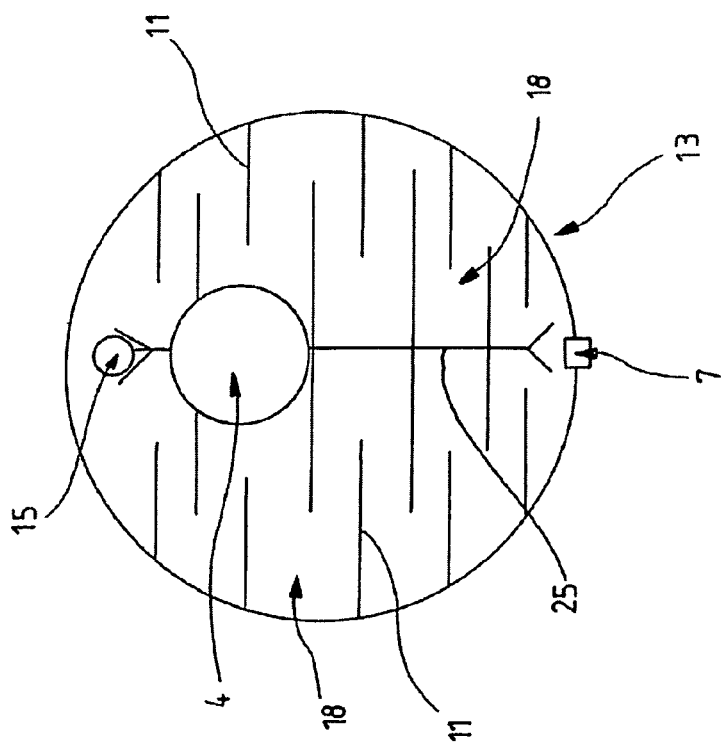

Other parallel deflection elements 11 similar to those on FIG. 6 are situated in the planes 13, 14 of the embodiment on FIG. 8, wherein each of the two planes 13, 14 incorporates two separate channels 18 that are respectively separated or converged at the openings in the respective plane 13, 14. These openings are the inlet opening 7 and the connection opening 1 in the upper plane 13, and the connection opening 15 and the outlet opening 15 in the lower plane 14. In order to separate the channels 18 in the respective plane, the deflection elements 11 are provided with another element 25, from which deflection elements 11 in turn extend. The additional deflection elements 11 extending from the element 25 create a respective meander structure in the channels 18.

Figure 9:
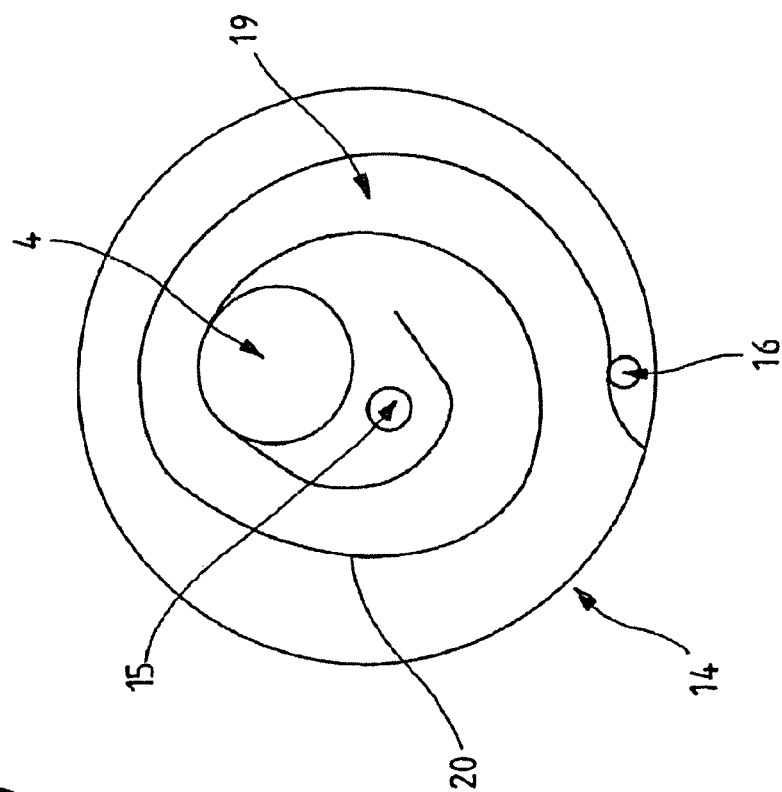
FIG. 9: is a depiction of the planes in a fourth embodiment of an antechamber with two planes and spiral structures arranged in the planes, top view.
Figure 9:
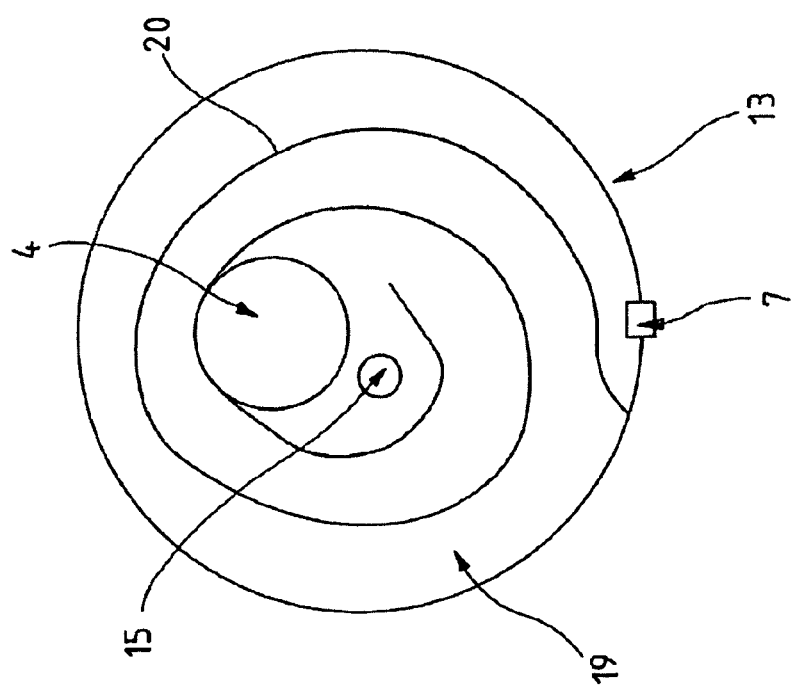

FIG. 9 shows a spiral structure in the antechamber planes. Instead of arranging numerous deflection elements 11 in the antechamber 6 and generating a meander structure with many windings, the continuous guiding element 20 here forms a channel 19, in which the inflowing fluid can be guided in a spiral around the measuring section 4 of the damping beaker 2. The fluid here flows through the antechamber 6 from the outside in in the upper plane 13, and from the inside out in the lower plane 14, opposite the upper plane 13.

Figure 10:
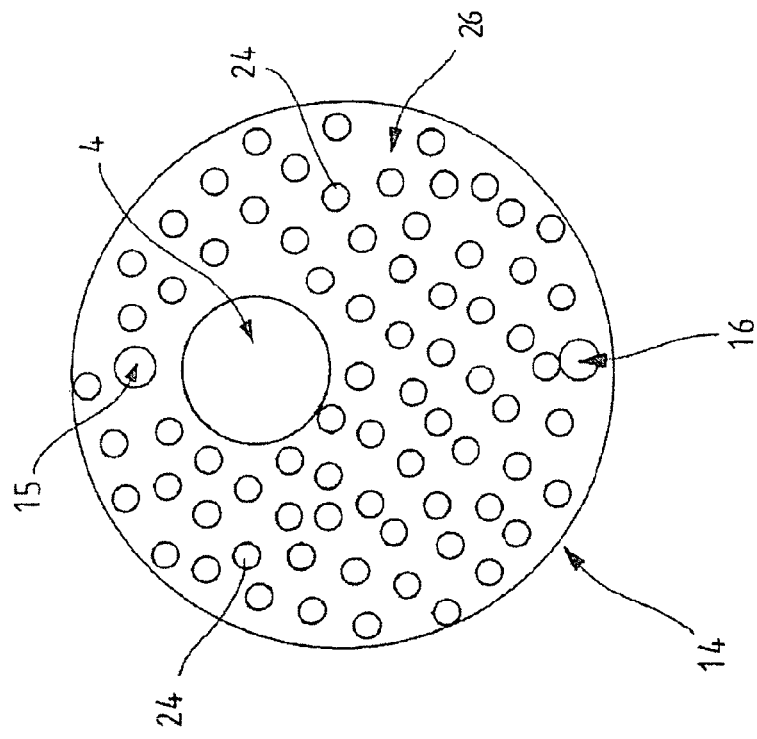
FIG. 10: is a depiction of the planes in a fifth embodiment of an antechamber with two planes and a plurality of domes arranged in the planes, top view.
Figure 10:
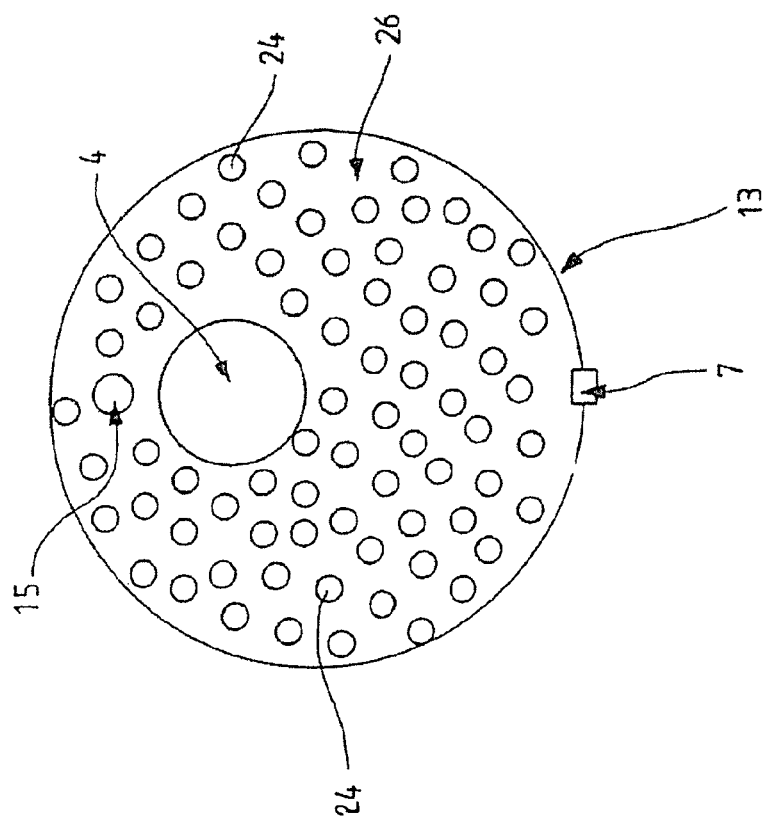

No guiding element 20 or deflection element 11 is provided in the embodiment on FIG. 10. The deceleration and distribution of inflowing fluid over the free surface 26 is influenced by a plurality of domes 24 arranged in the planes 13, 14, around which the inflowing fluid must flow.

Figure 11:
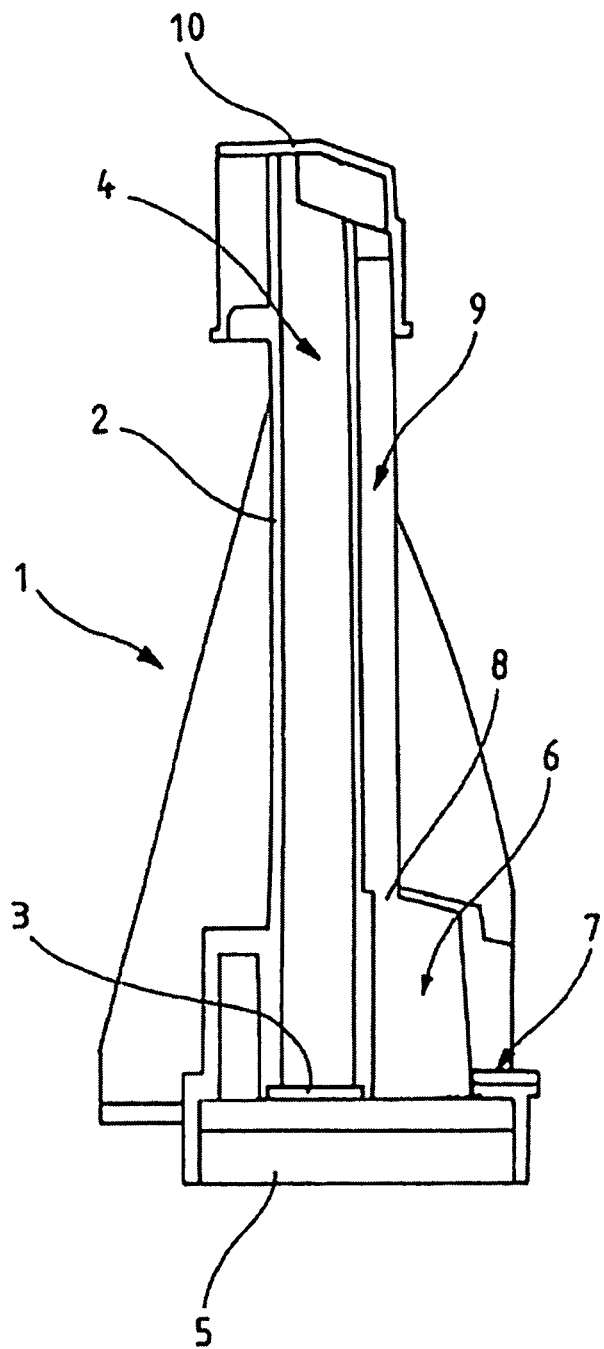
FIG. 11: is another embodiment of the device with a discharging device, cutaway view.

As on FIG. 1, the pedestal element 5 adjoins the antechamber 6 in the exemplary embodiment on FIG. 11, wherein a second outlet opening 8 is allocated to the antechamber 6. This second outlet opening 8 is arranged at the highest point of the antechamber 6, and leads into a discharging device 9, which is aligned parallel to the measuring section 4 of the damping beaker 2, outwardly adjoins the damping beaker 2, and exhibits roughly the height of the measuring section 4. In the upper end area of the discharging device 9 and the measuring section 4 of the damping beaker 2, the device 1 in turn has a screening element 10, which spans the vent openings of the measuring section 4 and the discharging device 9.

The discharging device 9 conveys the fluid that flows into the antechamber given sudden fill level changes, in particular given a dynamic driving style and jumps in speed, into the discharging device 9 via the outlet opening 8. The greater resistance and higher inertia of the fluid in the antechamber 6 that opposes the inflowing fluid ensures that the inflowing fluid does not get into the measuring section 4. By contrast, at low speeds and moderate speed increases, the fluid continues to flow toward the outlet opening 16 and inlet opening 17 of the measuring section 4 of the damping beaker 2 via the channel 18 formed in the antechamber 6.

What is claimed is:

1. A device for measuring the fill level in a container, comprising:
    an ultrasound sensor; and
    a damping beaker allocated to the sensor, said damping beaker having at least one antechamber, said antechamber having an inlet opening to the container and an outlet opening to the damping beaker,
wherein the antechamber has at least two planes lying horizontally over each other, wherein each plane has a geometric structure, and wherein the geometric structures of the planes are designed in such a way that fluid flows through the planes in opposite directions.

2. The device according to claim 1, wherein the fluid flows through the planes from the top down.

3. The device according to claim 1, wherein the geometric structure in at least one of the planes of the antechamber consists of deflection elements.

4. The device according to claim 3, wherein at least one of the deflection elements is rounded and thickened toward one free end.

5. The device according to claim 1, wherein the geometric structure is designed as a meander in at least one plane.

6. The device according to claim 5, wherein at least one of the planes has more than one meander, and wherein the meanders are separated from each other in said at least one plane.

7. The device according to claim 1, wherein the geometric structure is composed of individual barriers, which are offset relative to each other in at least one of the planes.

8. The device according to claim 1, wherein the geometric structure has domes in at least one of the planes.

9. The device according to claim 1, wherein the geometric structure is designed as a spiral in at least one of the planes.

10. The device according to claim 1, wherein the antechamber has a second outlet opening, which is arranged in directly in back of the inlet opening to the container in a direction of flow, and in front of windings of the antechamber.

11. The device according to claim 10, wherein the second outlet opening empties into a discharging device that is arranged parallel to a measuring section in the damping beaker.

12. An oil-lubricated engine having a device according to claim 1.

13. A motor vehicle having a device according to claim 1.

* * * * *